United States Patent [19]

Rewis

[11] Patent Number: 4,773,802
[45] Date of Patent: Sep. 27, 1988

[54] FREIGHT COVER

[76] Inventor: Jerry L. Rewis, Rte. 2, Box 466, Adel, Ga. 31620

[21] Appl. No.: 1,840

[22] Filed: Jan. 9, 1987

[51] Int. Cl.⁴ .............................................. B60P 7/00
[52] U.S. Cl. .................................... 410/118; 105/374; 160/368.1
[58] Field of Search ................ 410/118, 117; 105/374, 105/377, 423; 296/24 R, 138; 98/28; 160/368 R, 368 G, 327

[56] References Cited

U.S. PATENT DOCUMENTS

| | | | |
|---|---|---|---|
| 1,126,243 | 1/1915 | McQuown | 410/118 |
| 1,192,231 | 7/1916 | Scott | 410/118 X |
| 2,116,260 | 5/1938 | Corkran | 160/368 G |
| 4,096,807 | 6/1978 | Woodward | 410/118 |
| 4,621,856 | 11/1986 | McKenzie | 296/24 R |

Primary Examiner—Robert B. Reeves
Assistant Examiner—Joseph D. Pape
Attorney, Agent, or Firm—Paul H. Gallagher

[57] ABSTRACT

A freight cover for use in a box of a truck is disclosed herein which includes a panel of flexible material, a rigid bottom strip secured to the bottom edge of the panel and mounting straps secured to the top corners of the panel. The panel is rigidly mounted to the truck box at the bottom edge and may be either extended upwardly and detachably secured to the truck box with the mounting straps, inwardly of the box, to provide substantially tight seal with the truck box and protect freight located therein; or extended out through the box opening and dropped therebelow, whereby load articles can be moved through the opening over the rigid bottom strip attached to the lower edge of the panel without damaging the panel.

1 Claim, 1 Drawing Sheet

U.S. Patent  Sep. 27, 1988  4,773,802
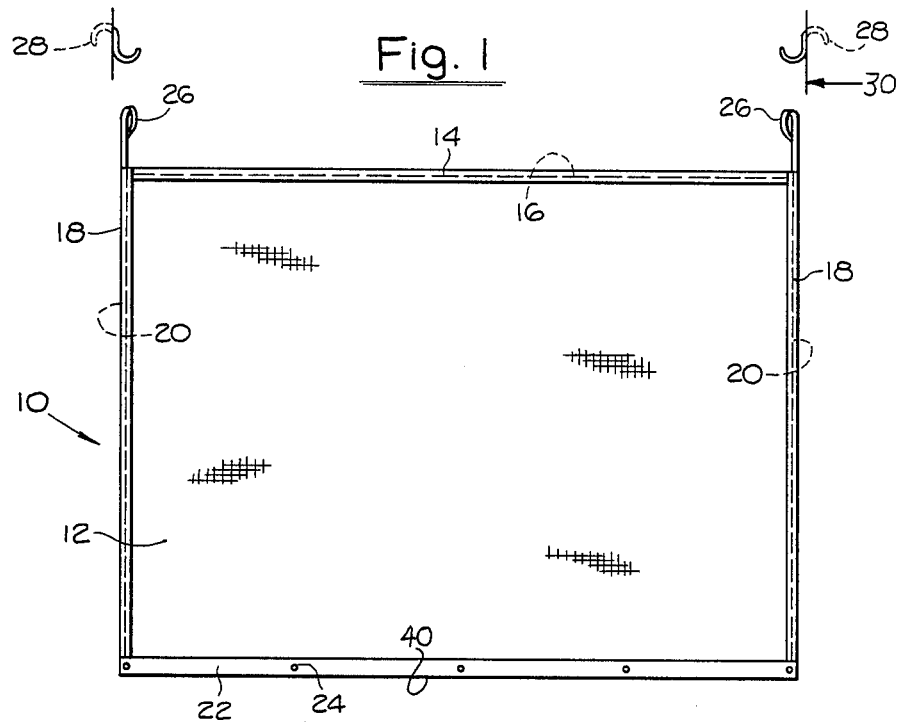
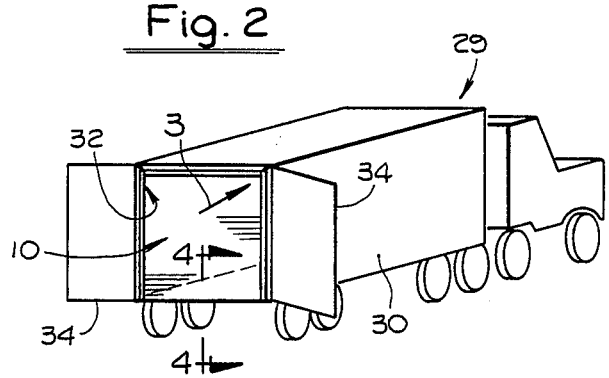
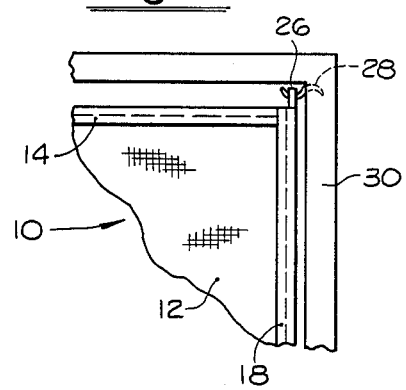
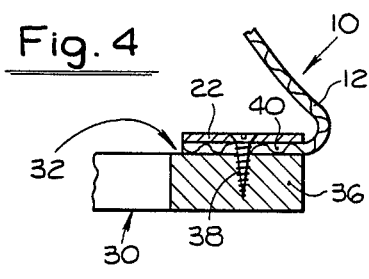
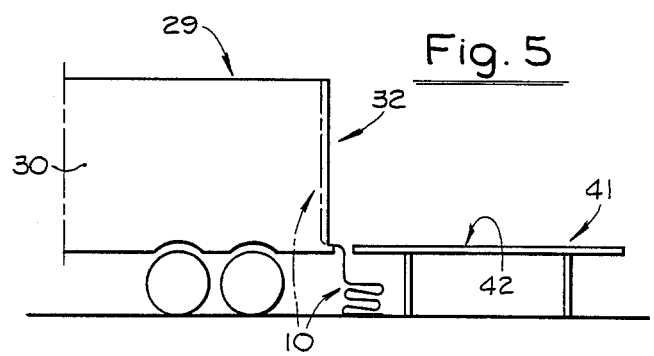
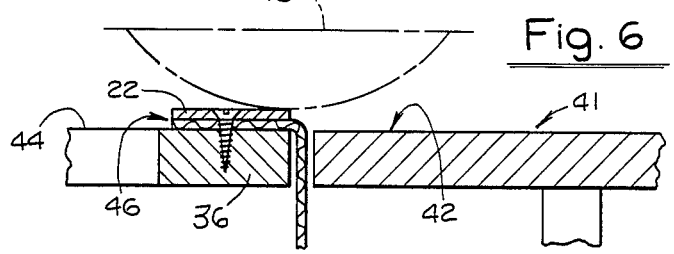

FREIGHT COVER

FIELD OF THE INVENTION

The invention resides in the field of freight transportation, particularly trucks. The freight load, or freight cargo, is exposed to weathering conditions, such as mist entering into the truck around a door that is not tightly sealed. Heretofore there has not been effective means for protecting freight in such circumstances.

OBJECTS OF THE INVENTION

A broad object of the invention is to provide a new kind of cover for freight in a truck for protecting the freight against the elements, in cases where it would not be fully protected by the usual door normally closing the access passage to the truck.

Another object is to provide such a freight cover that is extremely simple in construction and easy to manipulate in use, readily exposes the freight in truck, and renders it easily accessible and does not interfere with the loading and unloading operation.

DESCRIPTION OF A PREFERRED EMBODIMENT

In the drawings,

FIG. 1 is a face view of the freight cover of the invention.

FIG. 2 is a semi-diagrammatic perspective view of a truck, showing the freight cover of the invention mounted therein.

FIG. 3 is a fragmentary view taken at the position indicated by the arrow 3 in FIG. 2, and as viewed in the direction of the arrow.

FIG. 4 is a large scale sectional view taken at line 4—4 of FIG. 2.

FIG. 5 is side view of the rear end of the truck positioned adjacent a dock for loading or unloading.

FIG. 6 is a view containing the subject matter of FIG. 4, but showing the freight cover in a different position, and including a portion of the dock.

Referring to trucking transportation generally, a serious problem has been encountered and that is the exposure of the freight to weathering conditions, and particularly mist, and even rain, entering into the truck. This occurs despite the fact that the access doorway of the truck is closed by a door, but in most cases the doorway is not tightly sealed against the entrance of such mist and rain.

Referring to the drawings in detail, FIG. 1 shows the freight cover of the invention, isolated from its mounting in the truck in which it is to be used. The freight cover includes a panel 10 having a top binding strip 14 along its top edge 16 and side binding strips 18 along its side edges 20.

The panel 12 is of flexible material, which may be of any desired kind, such as canvas, plastic, etc., and the binding strips 14, 18, also may be of any suitable material, although they are flexible. They may be applied to the panel in any suitable manner, such as by stitching as indicated.

A bottom strip 22 is secured to the bottom edge 40 of the panel and this strip 22 is of rigid material, such as aluminum, and it may be secured to the panel and to the binding strips 18, in a suitable manner, such as by rivets 24.

Secured to the top edge of the panel, preferably at the corners thereof, are mounting straps 26, which are detachably hooked on hooks 28 mounted in the walls or ceiling of the truck, as will be referred to again hereinbelow.

A truck is indicated at 29 having a trailer 30 which may also be referred to as a box. The box has an access opening 32, which in this case is at the rear. The freight cover 10 is mounted in the truck box at the access opening 32.

The access opening 32 is normally closed by a door, or doors, 34 which may be swiging doors or a pull down door, as desired.

The truck box 30 has at its rear end, and forming a bounding element of the doorway 32, a bottom cross piece 36 (FIGS. 4 and 6). The lower edge 40 of the panel is secured to the truck box, preferably in the opening 32, and secured to the cross piece 36 by suitable means, such as screws 38. The lower edge is gripped between the rigid aluminum strip 22 and the element 36 of the box, then it extends rearwardly from its securement, and then is drawn upwardly within the truck box, to an upright position which is adjacent the vertical. It is also within the scope of the invention that the lower edge of the panel is secured in an alternate position, in which the panel 12 extends out from under the strip 22 in direction inwardly of the box.

The hooks 28 (FIG. 1) referred to above, are mounted in the truck box 30 (FIG. 3) in a suitable manner, such as mounting them in the wall elements of the truck box, or the ceiling, as convenient. The elastic mounting straps 26 that are secured to the panel are hooked on the hooks 28, thus detachably holding the panel in upright position, when in use.

The dimensions of the panel 10 are determined according to the dimensions of the truck box in which it is to be used. For most effective covering of the freight, it is substantially the full width of the truck box, and may extend as close to the top of the truck box as desired, and practical. For example the hooks 28 would be mounted closely adjacent the top, and they may be mounted in the top element of the box. The panel is also dimensioned in height according to height of the truck box, and the securement of the panel in position is such as to minimize or even prevent any space between the panel and the interior surface of the box. It will be appreciated that the hooks 28 and elastic mounting straps are represented diagrammatically as various kinds of securing means for securing the panel in position in engagement with, or closely adjacent to, the surfaces of the box.

The cover performs its function of protecting the freight, virtually without any hindrance to other steps in using the truck. The truck can be backed up to a dock 41, having a dock area or surface 42, for loading and unloading. In such a position the freight cover or panel is thrown down out the access opening, to a lower position, as represented in FIGS. 5 and 6. In this position it is entirely removed from the area or space used otherwise in the loading or unloading operations. In such position the lower edge of the cover, including the aluminum strip 22, is exposed, but the cover and aluminum strip are of such thickness that together they extend to a height only slightly greater than the floor 44 of the truck as indicated at 46. This space is extremely small, and particularly so in relation to a wheel 48 or other element of a skid or cart passing thereover. The level 42 of the dock is close to the upper level of the strip 22, and from a practical standpoint, substantially level therewith, this being within an ordinary range of positioning in practical movements of a truck, relative to the dock.

As noted above it is within the scope of the invention to have the lower edge of the main panel member 12 extend forwardly to the interior of the truck, opposite the position shown in FIGS. 4 and 6, but this is not preferred because when it is thrown out the rear of the truck, it overlies the aluminum strip 22 and thus subject to the passage of the carts thereover.

I claim:

1. A freight cover for use in a box of a truck having a floor and a doorway and a cross piece forming an extension of the floor and bottom bounding element of the doorway and extending the full width of the doorway, comprising, a panel of flexible material, having a top edge, side edges, and a bottom edge, and including a bottom strip of rigid material secured to the bottom edge thereof, the panel extending the full width of the doorway and of the truck box, top securing means attached to the top edge for releasably securing the panel in and to the truck box, bottom securing means fixedly securing the bottom edge of the panel to said cross piece, and thereby to the truck box floor, throughout the transverse dimension of the cross piece, whereby the panel, except the bottom edge thereof, can be extended out through the doorway and thereby enabled to drop therebelow, and load articles can be moved through the doorway over the lower edge of the panel without hindrance from the panel, the lower edge of the panel being secured to the upper surface of the cross piece and with the bottom strip uppermost, and the securing means securing the bottom strip of the cross piece with the lower edge of the panel gripped between the bottom strip and the cross piece, and the load articles in being moved through the doorway engage the bottom strip substantially to the exclusion of the panel.

* * * * *